US 6,578,101 B1

(12) United States Patent
Ahern

(10) Patent No.: US 6,578,101 B1
(45) Date of Patent: Jun. 10, 2003

(54) DUPLEX OPERATION AND SIMULTANEOUS INFORMATION TRANSFER ACROSS A LINK IN A EXPANDED COMPUTER SYSTEM

(75) Inventor: Frank W. Ahern, Scottsdale, AZ (US)

(73) Assignee: Mobility Electronics, Scottsdale, AZ (US)

( * ) Notice: Subject to any disclaimer, the term of this patent is extended or adjusted under 35 U.S.C. 154(b) by 0 days.

(21) Appl. No.: 09/819,057

(22) Filed: May 20, 2000

Related U.S. Application Data

(63) Continuation of application No. 09/130,058, filed on Aug. 6, 1998, now Pat. No. 6,070,214.

(51) Int. Cl.[7] .......................... G06F 13/40; G06F 13/00; G06F 13/42
(52) U.S. Cl. .................. 710/306; 709/200; 370/402
(58) Field of Search .................. 710/305, 52, 244, 710/21, 310, 72, 100, 106, 107, 311, 314, 306; 370/402; 709/200, 250, 253; 716/17; 257/499; 375/257; 712/32

(56) References Cited

U.S. PATENT DOCUMENTS

| 5,301,349 A | * | 4/1994 | Nakata et al. |
| 5,524,252 A | * | 6/1996 | Desai et al. |
| 5,548,730 A | * | 8/1996 | Young et al. |
| 5,696,911 A | * | 12/1997 | Fredriksson |
| 6,070,214 A | * | 5/2000 | Ahern |

* cited by examiner

*Primary Examiner*—Gopal C. Ray
(74) *Attorney, Agent, or Firm*—Jackson Walker LLP; Robert C. Klinger

(57) ABSTRACT

A bridge accessible by a host processor can expand access over a first bus to a second bus. The first bus and the second bus are each adapted to separately connect to respective ones of a plurality of bus-compatible devices. Allowable ones of the devices include memory devices and input/output devices. The bridge has a link, together with a first and a second interface. The first interface is coupled between the first bus and the link.

26 Claims, 4 Drawing Sheets

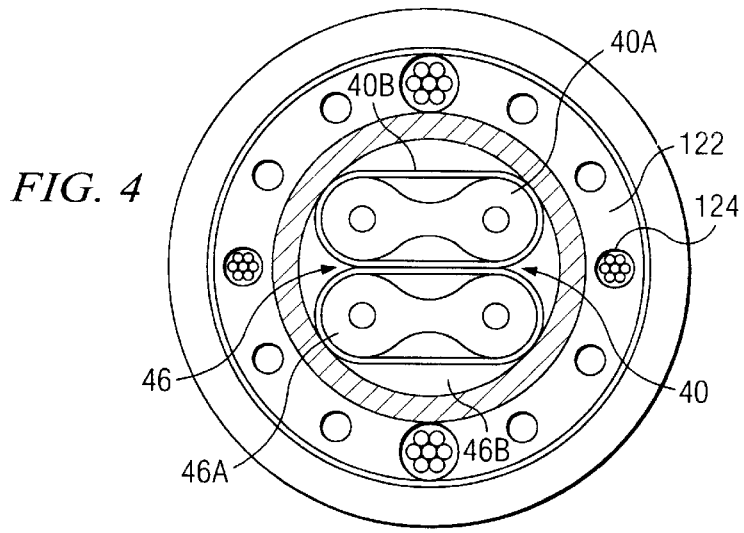
FIG. 4
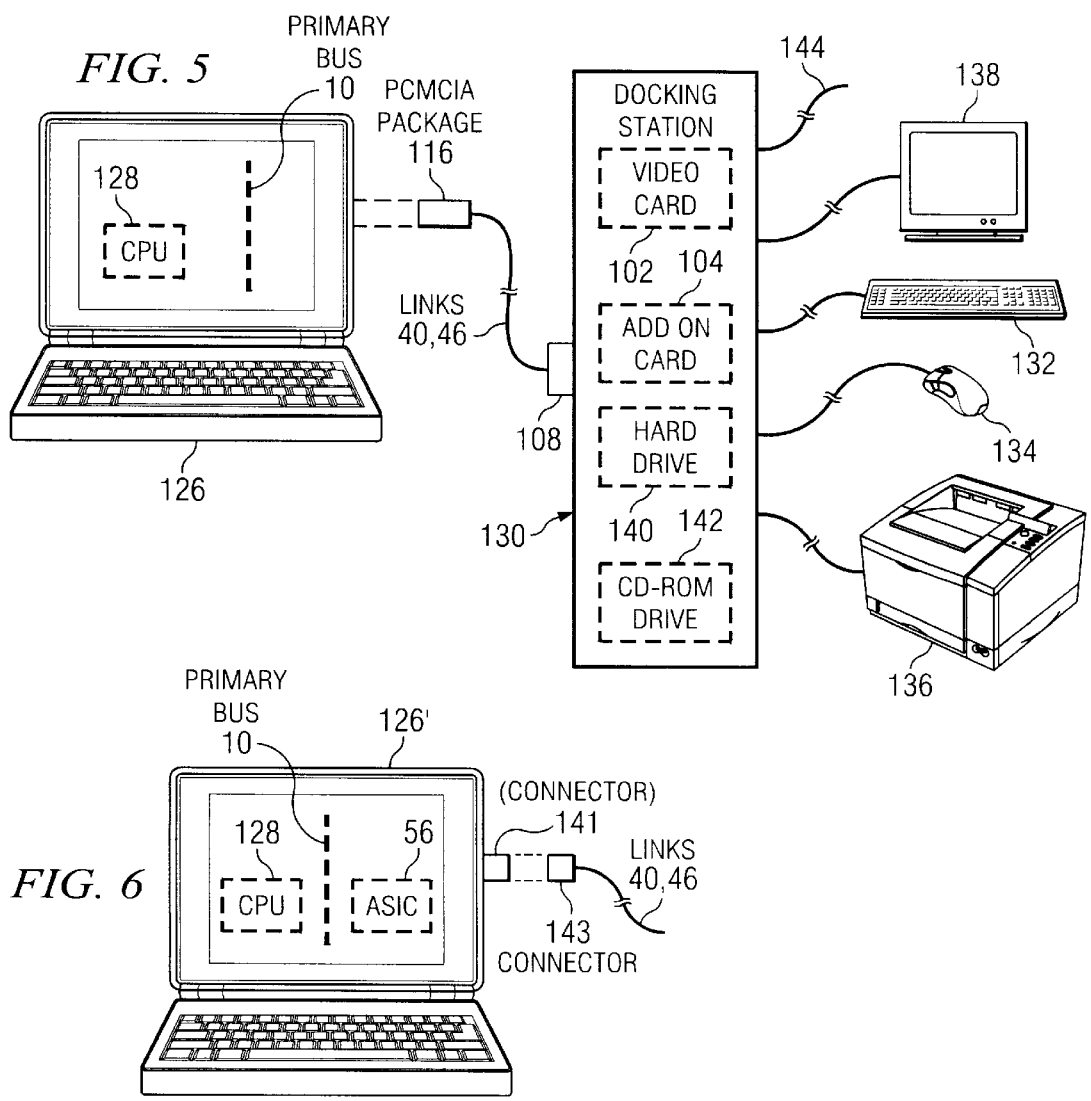
FIG. 5
FIG. 6

DUPLEX OPERATION AND SIMULTANEOUS INFORMATION TRANSFER ACROSS A LINK IN A EXPANDED COMPUTER SYSTEM

This is a continuation of application Ser. No. 09/130,058 filed Aug. 6, 1998, now U.S. Pat. No. 6,070,214.

BACKGROUND OF THE INVENTION

1. Field of the Invention

The present invention relates to data processing systems, and more particularly, to bridge systems including mechanisms for transferring information between buses.

2. Description of Related Art

Computers can use buses to transfer data between a host processor and various devices, such as memory devices and input/output devices. As used herein an "input/output" device is a device that either generates an input or receives an output (or does both). Thus "input/output" is used in the disjunctive. These buses may be arranged in a hierarchy with the host processor connected to a high level bus reserved for exchanging the data most urgently needed by the processor. Lower level buses may connect to devices having a lower priority.

Other reasons exist for providing separate buses. Placing an excessive number of devices on one bus produces high loading. Such loading makes a bus difficult to drive because of the power needed and the delays caused by signaling so many devices. Also, some devices on a bus may periodically act as a master and request control over a bus in order to communicate with a slave device. By segregating some devices on a separate bus, master devices can communicate with other devices on the lower level bus without tying up the bus used by the host processor or other masters.

The PCI bus standard is specified by the PCI Special Interest Group of Hillsboro, OR. The PCI bus features a 32-bit wide, multiplexed address-data (AD) Maintaining a high data throughput rate (e.g., a 33 MHZ clock rate) on the PCI bus leads to a fixed limitation on the number of electrical AC and DC loads on the bus. Speed considerations also limit the physical length of the bus and the capacitance that can be placed on the bus by the loads, while future PCI bus rates (e.g., 66 MHZ) will exacerbate the electrical load and capacitance concerns. Failure to observe these load restrictions can cause propagation delays and unsynchronized operation between bus devices.

To circumvent these loading restrictions, the PCI bus standard specifies a bridge to allow a primary PCI bus to communicate with a secondary PCI bus through such a bridge. Additional loads may be placed on the secondary bus without increasing the loading on the primary bus. For bridges of various types see U.S. Pat. Nos. 5,548,730 and 5,694,556.

The PCI bridge observes a hierarchy that allows an initiator or bus master on either bus to complete a transaction with a target on the other bus. As used herein, hierarchy refers to a system for which the concept of a higher or lower level has meaning. For example, a PCI bus system is hierarchical on several scores. An ordering of levels is observed in that a high level host processor normally communicates from a higher level bus through a bridge to a lower level bus. An ordering of levels is also observed in that buses at equal levels do not communicate directly but through bridges interconnected by a higher level bus. Also, an ordering of levels is observed in that data is filtered by their addresses before being allowed to pass through a bridge, based on the levels involved. Other hierarchical systems exist that may observe an ordering of levels by using one or more of the foregoing concepts, or by using different concepts.

Some personal computers have slots for add-on cards. Because a user often needs additional slots, expansion cards have been designed that will connect between the peripheral bus and an external unit that offers additional slots for add-on cards. For systems for expanding a bus, see U.S. Pat. Nos. 5,006,981; 5,191,657; and 5,335,329. See also U.S. Pat. No. 5,524,252.

For portable computers, special considerations arise when the user wishes to connect additional peripheral devices. Often a user will bring a portable computer to a desktop and connect through a docking station or port replicator to a keyboard, monitor, printer or the like. A user may also wish to connect to a network through a network interface card in the docking station. At times, a user may need additional devices such as hard drives or CD-ROM drives. While technically possible to a limited extent, extending a bus from a portable computer through a cable is difficult because of the large number of wires needed and because of latencies caused by a cable of any significant length.

In U.S. Pat. No. 5,696,949 a host chassis has a PCI to PCI bridge that connects through a cabled bus to another PCI to PCI bridge in an expansion chassis. This system is relatively complicated since two independent bridges communicate over a cabled bus. This cabled bus includes essentially all of the lines normally found in a PCI bus. This approach employs a delay technique to deal with clock latencies associated with the cabled bus. A clock signal generated on the expansion side of the cabled bus: (a) is sent across the cabled bus, but experiences a delay commensurate with the cable length; and (b) is delayed an equivalent amount on the expansion side of the cabled bus by a delay line there, before being used on the expansion side. Such a design complicates the system and limits it to a tuned cable of a pre-designed length, making it difficult to accommodate work spaces with various physical layouts.

U.S. Pat. No. 5,590,377 shows a primary PCI bus in a portable computer being connected to a PCI to PCI bridge in a docking station. When docked, the primary and secondary buses are physically very close. A cable is not used to allow separation between the docking station and the portable computer. With this arrangement, there is no interface circuitry between the primary PCI bus and the docking station. See also U.S. Pat. No. 5,724,529.

U.S. Pat. No. 5,540,597 suggests avoiding additional PCMCIA connectors when connecting a peripheral device to a PC card slot in a portable computer, but does not otherwise disclose any relevant bridging techniques.

U.S. Pat. No. 4,882,702 and show a programmable controller for controlling industrial machines and processes. The system exchanges data serially with a variety of input/output modules. One of these modules may be replaced with an expansion module that can serially communicate with several groups of additional input/output modules. This system is not bridge-like in that the manner of communicating with the expansion module is different than the manner of communicating with the input/output modules. For the expansion module the system changes to a block transfer mode where a group of status bytes are transferred for all the expansion devices. This system is also limited to input/output transactions and does not support a variety of addressable memory transactions. See also U.S. Pat. Nos. 4,413,319; and 4,504,927.

In U.S. Pat. No. 5,572,525 another bus designed for instrumentation (IEEE 488 General Purpose Instrumentation Bus) connects to an extender that breaks the bus information into packets that are sent serially through a transmission cable to another extender. This other extender reconstructs the serial packets into parallel data that is applied to a second instrumentation bus. This extender is an intelligent system operating through a message interpretation layer and several other layers before reaching the parallel to serial conversion layer. Thus this system is unlike a bridge. This system is also limited in the type of transactions that it can perform. See also U.S. Pat. No. 4,959,833.

U.S. Pat. No. 5,325,491 shows a system for interfacing a local bus to a cable with a large number of wires for interfacing with remote peripherals. See also U.S. Pat. Nos. 3,800,097; 4,787,029; 4,961,140; and 5,430,847.

The Small Computer System Interface (SCSI) defines bus standards for a variety of peripheral devices. This CSI bus is part of an intelligent system that responds to high-level commands. Consequently, SCSI systems require software drivers to enable hardware to communicate to the SCSI bus. This fairly complicated system is quite different from bridges such as bridges as specified under the PCI standard. A variety of other complex techniques and protocols exist for transferring data, including Ethernet, Token Ring, TCP/IP, ISDN, FDDI, HIPPI, ATM, Fibre Channel, etc., but these bear little relation to bridge technology.

See also U.S. Pat. Nos. 4,954,949; 5,038,320; 5,111,423; 5,446,869; 5,495,569; 5,497,498; 5,507,002; 5,517,623; 5,530,895; 5,542,055; 5,555,510; 5,572,688; and 5,611,053.

Accordingly, there is a need for an improved system for transferring information between buses.

SUMMARY OF THE INVENTION

In accordance with the illustrative embodiments demonstrating features, and advantages of the present invention, there is provided a bridge accessible by a host processor for expanding access over a first bus to a second bus. The first bus and the second bus are each adapted to separately connect to respective ones of a plurality of bus-compatible devices. Allowable ones of the devices include memory devices and input/output devices. The bridge has a link, together with a first and a second interface. The second interface is adapted to couple between the second bus and the link. The first interface and the second interface operating as a single bridge are operable to (a) send outgoing information serially through the link in a format different from that of the first bus and the second bus without waiting for an incoming acknowledgment over said link before inaugurating a transfer of said information over said link, (b) approve an initial exchange between the first bus and the second bus in response to a pending transaction having a characteristic signifying a destination across the bridge, and (c) allow the host processor, communicating through the first bus, to individually address different selectable ones of the bus-compatible devices on the second bus, including memory devices and input/output devices that may be present: (i) using on the first bus substantially the same type of addressing as is used to access devices the first bus, and (ii) without first employing a second, intervening one of the bus-compatible devices on the second bus.

In accordance with another aspect of the invention a bridge accessible by a host processor can expand access over a first bus to a second bus. The first bus and the second bus each are adapted to separately connect to respective ones of a plurality of bus-compatible devices. Allowable ones of the devices include memory devices and input/output devices. The bridge has a link, together with a first and a second interface. The first interface is adapted to couple between the first bus and the link. The second interface is adapted to couple between the second bus and the link. The first interface and the second interface are operable to (a) send information serially through the link in a format different from that of the first bus and the second bus, (b) exchange information between the first bus and the second bus according to a predetermined hierarchy giving the first bus a higher level than the second bus, and (c) allow the host processor, communicating through the first bus, to individually address different selectable ones of the bus-compatible devices on the second bus, including memory devices and input/output devices that may be present: (i) using on the first bus substantially the same type of addressing as is used to access devices on the first bus, (ii) without first employing a second intervening one of the bus-compatible devices on the second bus, and (iii) without passing the information through an intervening hierarchical level.

In accordance with another, further aspect of the invention a bridge accessible by a processor can expand access over a first bus to a second bus. The first bus and the second bus each are adapted to separately connect to respective ones of a plurality of bus-compatible devices. The bridge has a link and a first and a second interface. The first interface is coupled between the first bus and the link. The second interface is adapted to couple between the second bus and the link. The first interface and the second interface operate as a single bridge and is operable to transfer information serially through the link in a format different from that of the first bus and the second bus without waiting for an incoming acknowledgment over the link before inaugurating a transfer of the information over the link.

By employing apparatus and methods of the foregoing type, an improved system is achieved for transferring information between buses. In one preferred embodiment, two buses communicate over a duplex link formed with a pair of simplex links, each employing twisted pair or twin axial lines (depending on the desired speed and the anticipated transmission distance). Information from the buses are first loaded onto FIFO (first-in first-out) registers before being serialized into frames for transmission over the link. Received frames are deserialized and loaded into FIFO registers before being placed onto the destination bus. Preferably, interrupts, error signals, and status signals are sent along the link.

In this preferred embodiment, address and data are taken from a bus one transaction at a time, together with four bits that act either as control or byte enable signals. Two or more additional bits may be added to tag each transaction as either: an addressing cycle; acknowledgment of a non-posted write; data burst; end of data burst (or single cycle). If these transactions are posted writes they can be rapidly stored in a FIFO register before being encoded into a number of frames that are sent serially over a link. When pre-fetched reads are allowed, the FIFO register can store pre-fetched data in case the initiator requests it. For single cycle writes or other transactions that must await a response, the bridge can immediately signal the initiator to wait, even before the request is passed to the target.

In a preferred embodiment, one or more of the buses follows the PCI or PCMCIA bus standard (although other bus standards can be used instead). The preferred apparatus then operates as a bridge with a configuration register that is loaded with information specified un er the PCI standard. The apparatus can transfer information between buses depending upon whether the pending addresses fall within a range embraced by the configuration registers. This scheme works with devices on the other side of the bridge, which can be given unique base addresses to avoid addressing conflicts.

In one highly preferred embodiment, the apparatus maybe formed as two separate application-specific integrated circuits (ASIC) joined by a cable. Preferably, these two integrated circuits have the same structure, but can act in two different modes in response to a control signal applied to one of its pins. Working with hierarchical buses (primary and secondary buses) these integrated circuits will be placed in a mode appropriate for its associated bus. The ASIC associated with the secondary bus preferably has an arbiter that can grant masters control of the secondary bus. This preferred ASIC can also supply a number of ports to support a mouse an keyboard, as well as parallel and serial ports.

When used with a portable computer, one of the ASIC's can be assembled with a connector in a package designed to fit into a PC card slot following the PCMCIA standard. This ASIC can connect through a cable to the other ASIC, which can be located in a docking station. Accordingly, the apparatus can act as a bridge between a CardBus and a PCI bus located in a docking station. Since the preferred ASIC can also provide a port for a mouse and keyboard, this design is especially useful for a docking station. Also, the secondary PCI bus implemented by the ASIC can connect to a video card or to a video processing circuit on the main dock circuit board in order to drive a monitor.

In some embodiments, one ASIC will be mounted in the portable computer by the original equipment manufacturer (OEM). This portable computer will have a special connector dedicated to the cable that connects to the docking station with the mating ASIC. For such embodiments, the existence within the preferred ASIC of ports for various devices can be highly advantageous. An OEM can use this already existing feature of the ASIC and thereby eliminate circuitry that would otherwise have been needed to implement such ports.

BRIEF DESCRIPTION OF THE DRAWINGS

The above brief description as well as other objects, features and advantages of the present invention will be more fully appreciated by reference to the following detailed description of presently preferred but nonetheless illustrative embodiments in accordance with the present invention when taken in conjunction with the accompanying drawings, wherein:

FIG. 4 is a cross-sectional view of the cable of FIG. 3;

FIG. 5 is a schematic illustration of the bridge of FIG. 3 shown connected to a portable computer and a variety of peripheral devices; and FIG. 6 shows a docking station similar to that of FIG. 5 but with the portable computer modified to contain an application-specific integrated circuit designed to support a link to the docking station.

DETAILED DESCRIPTION OF THE PREFERRED EMBODIMENTS

Figure 1:
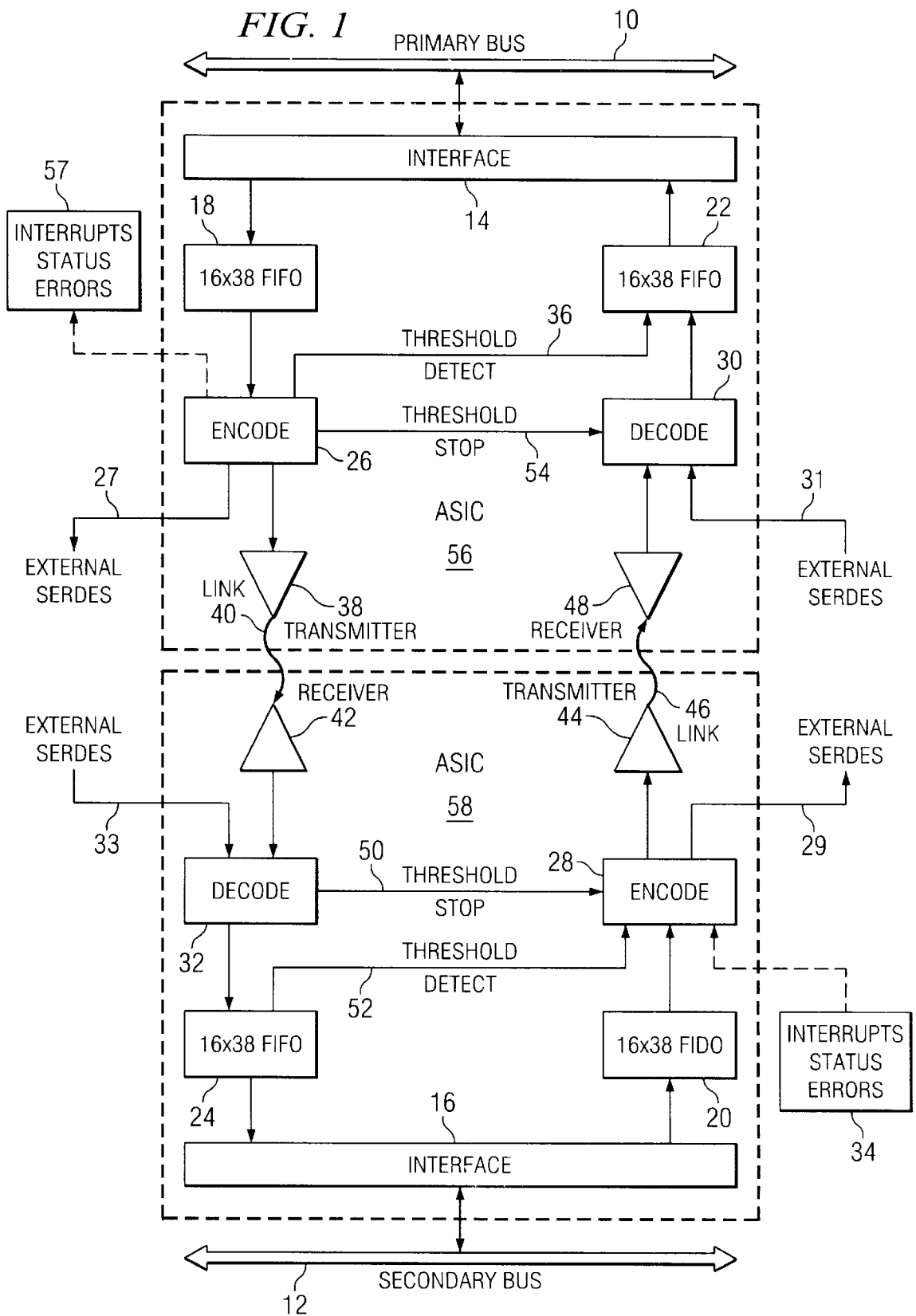
FIG. 1 is a schematic block diagram showing a bridge split by a link within the bridge, in accordance with principles of the present invention.

Referring to FIG. 1, a bridge is shown connecting between a first bus 10 and a second bus 12 (also referred to as primary bus 10 and secondary bus 12). These buses may be PCI or PCMCIA 32-bit buses, although other types of buses are contemplated and the present disclosure is not restricted to any specific type of bus. Buses of this type will normally have address and data lines. In some cases, such as wit the PCI bus, address and data are multiplexed onto the same lines. In a dition, these buses will have signaling lines for allowing devices on the bus to negotiate transactions. For the PCI standard, these signaling lines will in lude four lines that are used either for control or byte enabling (C/BE[3:01). Others signaling lines under the PCI standard exist for gaining control over the bus, for handshaking, and the like (e.g., FRAME#, TRDY#, IRDY#, STOP#, DEVSEL#, etc.)

Buses 10 and 12 are shown connecting to a first interface 14 and second interface 16, respectively (also referred to as interfaces 14 and 16). Bus information selected for transmission by interfaces 14 and 16 are loaded into registers 18 and 20, respectively. Incoming bus information that interfaces 14 and 16 select for submission to the buses are taken from registers 22 and 24, respectively. In one embodiment, registers 18–24 are each 16×38 FIFO registers, although different types of registers having different dimensions may be used in alternate embodiments.

In this embodiment, registers 18–24 are at least 38 bits wide. Thirty six of those bits are reserved for the 4 control bits (C/BE#[3:01]) and the 32 address/data bits (AD[31:0]) used under the PCI bus standard. The remaining two bits can be used to send additional tags for identifying the nature of the transaction associated therewith. Other bits may be needed to fully characterize every contemplated transaction. Transactions can be tagged as: addressing cycle; acknowledgment of a non posted write; data burst; end of data burst (or single cycle). Thus outgoing write transactions can be tagged as a single cycle transaction or as part of a burst. Outgoing read requests can also be tagged as part of a burst with a sequence of byte enable codes (C/BE) for each successive read cycle of the burst. It will be appreciated that other coding schemes using a different number of bits can be use in other embodiments.

The balance of the structure illustrated in FIG. 1 is a link designed to establish duplex communications between interfaces 14 and 16 through registers 18–24. For example, encode 28 can accept the oldest 38 bits from register 20 and parse it into five bytes (40 bits). The extra two bits of the last byte are encoded to signify the interrupts, status signals and error signals that may be supplied from block 34.

Each of these five bytes is converted into a 10 bit frame that can carry the information of each byte, as well as information useful for regulating the link. For example, these frames can carry comma markers, idle markers, or flow control signals, in a well-known fashion. A transceiver system working with bytes that were encoded into such 10 bit frames is sold commercially by Hewlett Packard as model number HDMP-1636 or -1646. Frames produced by encoder 28 are forwarded through transmitter 44 along simplex link 46 to receiver 48, which supplies the serial information to decoder 30. Likewise, encoder 26 forwards serial information through transmitter 38 along simplex link 40 to receiver 42, which supplies the serial information to decoder 32.

Flow control may be necessary should FIFO registers 22 or 24 be in danger of overflowing. For example, if FIFO register 22 is almost full, it supplies a threshold detect signal 36 to encoder 26, which forwards this information through link 40 to decoder 32. In response, decoder 32 issues a threshold stop signal 50 to encoder 28, which then stops forwarding serial information, thereby preventing an overflow in FIFO register 22. In a similar fashion, a potential overflow in FIFO register 24 causes a threshold detect signal 52 to flow through encoder 28 and link 46 to cause decoder 30 to issue a threshold stop signal 54, to stop encoder 26 from sending more frames of information. In some embodiments, the system will examine the received information to determine if it contains transmission errors or has been corrupted in some fashion. In such event the system can request a retransmission of the corrupted information and thereby ensure a highly reliable link.

In this embodiment, elements 14, 18, 22, 26, 30, 38 and 48 are part of a single, application specific integrated circuit (ASIC) 56. Elements 16, 20, 24, 28, 32, 42 and 44 are also part of an ASIC 58. As described further hereinafter, first ASIC 56 and second ASIC 58 have an identical structure but can be operated in different mode. It will be appreciated that other embodiments may not use ASIC's but may use instead alternate circuitry, such as a programable logic device, or the like. As shown herein, ASIC 56 is operating in a mode designed to service primary bus 10, and (for reasons to be described presently) will be sending outputs to block 57. In contrast block 34 of ASIC 58 will receive inputs from block 34.

Encoders 26 and 28 have optional parallel outputs 27 and 29, respectively, for applications requiring such information. Also for such applications, decoders 30 and 32 have parallel inputs 31 and 33, respectively. These optional inputs and outputs may be connected to an external transceiver chip, such as the previously mentioned device offered by Hewlett Packard as model number HDMP-1636 or -1646. These devices will still allow the system to transmit serial information, but by means of an external transceiver chip. This allows the user of the ASIC's 56 and 58 more control over the methods of transmission over the link.

Figure 2:
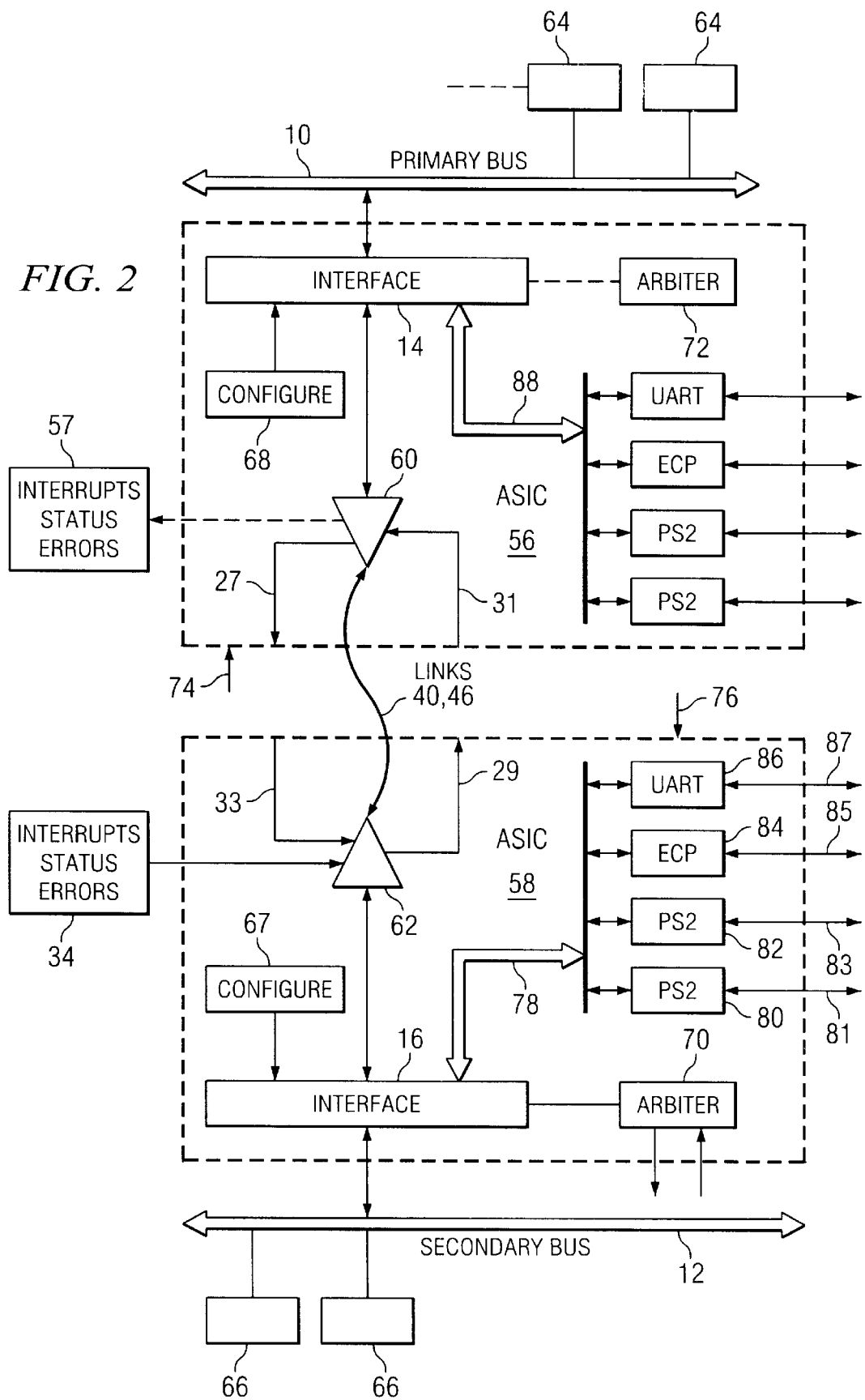
FIG. 2 is a schematic block diagram showing a bridge in accordance with principles of the present invention using the link of FIG. 1.

Referring to FIG. 2, previously mentioned ASIC's 56 and 58 are shown in further detail. The previously mentioned encoders, decoders, transmitters, receivers, and FIFO registers are combined into blocks 60 and 62, which are interconnected by a duplex cable formed of previously mentioned simplex links 40 and 46. Previously mentioned interface 14 is shown connected to primary bus 10, which is also connected to a number of bus-compatible devices 64. Similarly, previously mentioned interface 16 is shown connected to secondary bus 12, which is also connected to a number of bus-compatible devices 66. Devices 64 and 66 may be PCI-compliant devices and may operate as memory devices or input/output devices.

Interface 14 a shown connected to a first register means 68, which acts as a configuration register in compliance with the PCI standard. Since this system will act as a bridge, configuration registers 68 will have the information normally associated with a bridge. Also, configuration registers 68 will contain a base register and limit register to indicate a range or predetermined schedule of addresses for devices that can be found on the secondary bus 12. Under the PCI standard, devices on a PCI bus will themselves each have a base register, which allows mapping of the memory space and/or I/O space. Consequently, the base and limit registers in configuration registers 68 can accommodate the mapping that is being performed by individual PCI devices. The information on configuration registers 68 are mirrored on second configuration register 67 (also referred to as a second configuration means). This makes the configuration information readily available to the interfaces on both sides of the link.

In this embodiment, ASIC 58 has an arbiter 70. Arbiters are known devices that accept requests from masters on secondary bus 12 for control of 25 the bus. The arbiter has a fair algorithm that grants the request of one of the contending masters by issuing it a grant signal. In this hierarchical scheme, secondary bus 12 requires bus arbitration, but primary bus 10 will provide its own arbitration. Accordingly, ASIC 56 is placed in a mode where arbiter 72 is disabled. The modes of ASIC's 56 and 58 are set by control signals applied to control pins 74 and 76, respectively. Because of this mode selection, the signal directions associated with blocks 57 an 34 will be reversed.

In this embodiment, ASIC 58 is in a mode that implements a third bus 78. Bus 78 may follow the PCI standard, but is more conveniently implemented in a different standard. Bus 78 connects to a number of devices that act as a port means. For example, devices 80 and 82 can implement PS/2 ports that 5 can connect to either a mouse or a keyboard. Device 84 implements an ECP/EPP parallel port for driving a printer or other device. Device 86 implements a conventional serial port. Devices 80, 82, 84 and 86 are shown with input/output lines 81, 83, 85 and 87, respectively. Devices 80–86 may be addressed on bus 10 as if they were PCI devices on bus 12. Also in this embodiment, a bus 88 is shown in ASIC 56, with the same devices as shown on bus 78 to enable an OEM to implement these ports without the need for separate input/output circuits.

Figure 3:
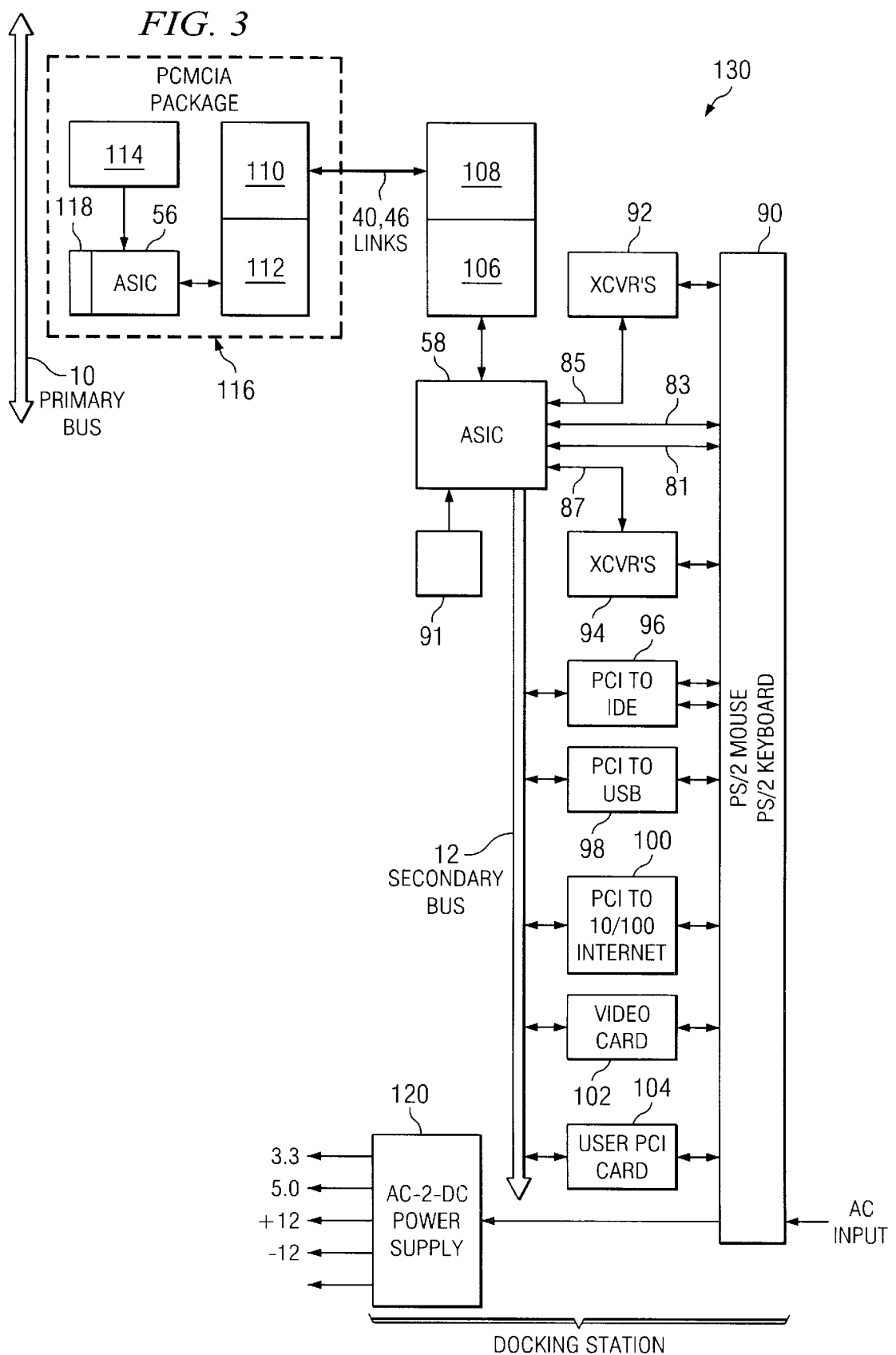
FIG. 3 is a schematic block diagram showing the bridge of FIG. 2 used in a docking system in accordance with principles of the present invention.

Referring to FIG. 3, previously mentioned ASIC 58 is shown in a 15 docking station 130 connected to an oscillator 91 for establishing a remote and internal clock. ASIC 58 has its lines 81 and 83 connected through a connection assembly 90 for connection to a keyboard and mouse, respectively. Serial lines 85 and parallel lines 87 are shown connected to transceivers 92 and 94, respectively, which then also connect to connection assembly 90 for connection to various parallel and serial peripheral, such as printers and modems.

ASIC 58 is also shown connected to previously mentioned secondary bus 12. Bus 12 is shown connected to an a adapter card 96 to allow the PCI bus 12 to communicate with an IDE device such as a hard drive, backup tape drive, CD-ROM drive, etc. Another adapter card 98 is shown for allowing communications from bus 12 to a universal serial port (USB). A network interface card 100 will allow communications through bus 12 to various networks operating under the Ethernet standard, Token Ring standard, etc. Video adapter card 102 (also referred to as a video means) allows the user to operate another monitor. Add-on card 104 may be one of a variety of cards selected by the user to perform a useful function. While this embodiment shows various functions being implemented by add-on cards, other embodiments may implement one or more of these function on a common circuit board in the dock (e.g., all functions excluding perhaps the IDE adapter card).

ASIC 58 communicates through receiver/transmitter 106, which provides a physical interface through a terminal connector 108 to cable 40, 46. Connector 108 may be a 20 pin connector capable of carrying high speed signals with EMI shielding (for example a low force helix connector of the type offered by Molex Incorporated), although other connector types may used instead. The opposite end of cable 40, 46 connects through a gigabit, terminal connector 110 to physical interface 112, which acts as a receiver/transmitter. Interface 112 is shown connected to previously mentioned first ASIC 56, which is also shown connected to an oscillator 114 to establish a local clock signal. This specific design contemplates sing an external transmitter/receiver (external SERDES of lines 27, 29, 31, and 33 of FIG. 1), although other embodiments can eliminate these external devices in favor of the internal devices in ASIC's 56 and 58.

This embodiment is adapted to cooperate with a portable computer having a PCMCIA 32-bit bus 10, although other types of computers can be serviced. Accordingly, ASIC 56 is shown in a package 116 having an outline complying with the PCMCIA standard and allowing package 116 to fit into a slot in a portable computer. Therefore, ASIC 56 has a connector 118 for 25 connection to bus 10. Cable 40, 46 will typically be permanently connected to package 116, but a detachable connector may be used in other embodiments, where a user wishes to leave package 16 inside the portable computer.

Power supply 120 is shown producing a variety of supply voltages used to power various components. In some embodiments, one of these supply lines can be connected directly to the portable computer to charge its battery. Referring to FIG. 4, the previously mentioned simplex links 40 and 46 are shown as twin axial lines 40A an 46A, wrapped with individual shields 40B and 46B. A single shield 122 encircles the lines 40 and 46. Four parallel wires 124 are shown (although a greater number may be used in other embodiments) mounted around the periphery of shields 122 for various purposes. These wires 124 may carry power management signals, dock control signals or other signals that may be useful in an interface between a docking station and a portable computer. While twin axial lines offer high performance, twisted pairs or other transmission media may be used in other embodiments where the transmission distance is not as great and where the bit transfer speed need not be as high. While a hard wire connection is illustrated, in other embodiments a wireless or other type of connection can be employed instead.

Referring to FIG. 5, previously mentioned package 116 is shown in position to be connected to a PCMCIA slot in portable computer 126. Computer 126 is shown having primary bus 10 and a host processor 128. Package 116 is shown connected through cable 40, 46 to previously mentioned connector 108 on docking station 130. Previously mentioned docking station 130 is shown connecting through PS/2 ports to keyboard 132 and mouse 134. A printer 136 is shown connected to parallel port in docking station 130. Previously mentioned video means 102 is shown connected to a monitor 138. Docking station 130 is also shown with an internal hard drive 140 connecting to the adapter card previously mentioned. A CD-ROM drive 142 is also shown mounted in docking station 130 and connects to the secondary bus through an appropriate adapter card (not shown). Previously mentioned add-on card 104. is shown with its own cable 144.

Referring to FIG. 6, a modified portable computer 126' is again shown with a host processor 128 and primary bus. In this embodiment however, portable computer 126' contains previously mentioned ASIC 56. Thus there is no circuitry required (other than perhaps drivers) between ASIC 56 and cable 40, 46. In this case, the laptop end of cable 40, 46 has a connector 142 similar to the one on the opposite end of the cable (connector 108 of FIG. 5). Connector 143 is designed to mate with connector 141 and support the highspeed link. As before, connectors 141 and 143 can also carry various power management signals, and other signal associated with a docking system.

An important advantage of this arrangement is the fact that ASIC 56 contains circuitry for providing ports, such as a serial port, a parallel port, PS/2 ports for a mouse and keyboard, and he like. Since portable computer 126' would ordinarily provide such ports, ASIC 56 simplifies the design of the portable computer. This advantage is in addition to the advantage of having a single ASIC design (that is, ASIC's 56 and 58 are structured identically), which single design is capable of operating at either the portable computer or the docking station, thereby simplifying the ASIC design and reducing stocking requirements, etc.

To facilitate an understanding of the principles associated with the foregoing apparatus, its operation will be briefly described. This operation will be described in connection with the docking system of FIGS. 3 and 5 (which 20 generally relates to FIG. 2), although operation would be similar for other types of arrangements. For the docking system, a connection is established by plugging package 116 (FIG. 5) into portable computer 126. This establishes a link between the primary bus 10 and SIC 56 (FIG. 3).

At this time an initiator (the host processor or a master) having access to primary bus 10 may assert control of the bus. An initiator will normally send a request signal to an internal arbiter (not shown) that will eventually grant control to this initiator. In any event, the initiator asserting control over primary bus 10 will exchange the appropriate handshaking signals and drive an address onto the bus 10. Control signals simultaneously applied to the signaling lines of bus 10 will indicate whether the transaction is a read, write, or other type of transaction.

Interface 14 (FIG. 2) will examine the pending address and determine whether it represents a transaction with devices on the other side of the bridge (that is, secondary bus 12) or with the bridge itself. Configuration register 68 has already been loaded in the usual manner with information that indicates a range of addresses defining the jurisdiction of the interface 14.

Assuming a write transaction is pending on bus 10, interface 14 will transfer 32 address bits together with four control bits (PCI standard) to FIFO register 18 (FIG. 1). Encoder 26 will add at least two additional bits tagging this information as an addressing cycle. The information is then broken into frames that can carry flow control and other signals before being transmitted serially over link 40.

Without waiting, interface 14 will proceed to a data cycle and accept up to 32 bits of data from bus 10 together with four byte enable bits. As before, this information will be tagged, supplemented with additional information and broken into frames for serial transmission over link 40. This transmitted information will be tagged to indicate whether it is part of a burst or a single cycle.

Upon receipt, decoder 32 restore the frames into the original 38 bit format and loads the last two described cycles onto the stack of register 24. Interface 16 eventually notices the first cycle as an addressing cycle in a write request. Interface 16 then negotiates control over bus 12 in the usual fashion and applies the address to bus 12. A device on bus 12 will respond to the write request by performing the usual handshaking.

Next, interface 16 will drive the rite data stacked on register 24 into bus 12. If this transaction is a burst, interface 16 will continue to drive data onto bus 12 by fetching it from register 24. If however this transaction is a single cycle write, interface 16 will close the transaction on bus 12 and load an acknowledgment into register 20. Since this acknowledgment need not carry data or address information, a unique code may be placed into register 20, so that encoder 28 can appropriately tag this line before parsing it into frames for transmission over link 46. Upon receipt, decoder 30 will produce a unique code that is loaded into register 22 and eventually forwarded to interface 14, which sends an acknowledgment to the device on bus 10 that the write has 10 succeeded.

If the initiator instead sets its control bits during the address cycle to indicate a read request, interface 14 would also accept this cycle, if it has jurisdiction. Interface 14 will also signal the initiator on bus 10 that it is not ready to return data (e.g., a retry signal, which may be the stop signal as defined under the PCI standard). The initiator can still start (but not finish) a data cycle by driving its signaling lines on bus 10 with byte enable information. Using the same technique, the address information, followed by the byte enable information, will be accepted by interface 14 and loaded with tags into register 18. These two lines of information will be then encoded and transmitted serially 20 over link 40. Upon receipt, this information will be loaded into the stack of register 24. Eventually, interface 16 will notice the first item as a read request and drive this address information onto secondary bus 12. A device on bus 12 will respond and perform the appropriate handshaking. Interface 16 will then forward the next item of information from register 24 containing the byte 25 enables, onto bus 12 so the target device can respond with the requested data. This responsive data is loaded by in 16 into register 20. If pre-fetching is indicated, interface 16 will initiate a number of successive read cycles to accumulate data in register 20 from sequential addresses that may or may not be requested by the initiator.

As before, this data is tagged, broken into frames and sent serially over link 46 to be decoded and loaded into register 22. The transmitted data can include pre-fetched data that will be accumulated in register 22. Interface 14 transfers the first item of returning data onto primary bus 10, and allows the initiator to proceed to another read cycle if desired. If another read cycle is conducted as part of a burst transaction, the requested data will already be present in register 22 for immediate delivery by interface 14 to bus 10. If these pre-fetched data are not requested for the next cycle, then they are discarded.

Eventually the initiator will relinquish control of bus 10. Next, an initiator 10 on bus 12 may send a request for control of bus 12 to arbiter 70 (FIG. 2). If arbiter 70 grants control, the initiator may make a read or write request by driving an address onto bus 12. Interface 16 will respond if this address does not fall within the jurisdictional range of addresses specified in configuration register 67 (indicating the higher level bus 10 may have jurisdiction). In the same manner as before, but with a reversed flow over links 40, 46, interface 16 may accept address and data cycles and communicate them across link 40, 46. Before being granted bus 10, interface 14 will send a request to an arbiter (not shown) associated with bus 10.

In some instances, an initiator on primary bus 10 will wish to read from, or write to, port means 80, 82, 84, or 86. These four items are arranged to act as devices under the PCI standard. Interface 16 will therefore act as before, except that information will be routed not through bus 12, but through bus 78.

Other types of transactions may be performed, including reads and writes to the configuration registers 67 and 68 (FIG. 2). Other types of transactions, as defined under the PCI standard (or other bus standards) may be performed as well.

Interrupt signals may be generated by the ports or other devices in ASIC 58. Also external interrupts may be received as indicated by block 34. As noted before, interrupt signals may be embedded in the code sent over link 46. Upon receipt, system 60 decodes the interrupts and forwards them on to block 57, which may be simply one or more pins from ASIC 56 (implementing, for example, INTA of the PCI standard). This interrupt signal can either be sent over the bus 10 or to an interrupt controller that forwards interrupts to the host processor. System errors may be forwarded in a similar fashion to produce an output on a pin of ASIC 56 that can be routed directly to bus 10 or processed using dedicated hardware. The designer may wish to send individual status signals, which can be handled in a similar fashion along link 40, 46.

It is appreciated that various modifications may be implemented with respect to the above described, preferred embodiment. In other embodiments the illustrated ASIC's may be divided into several discrete packages using in some cases commercially available integrated circuits. Also, the media for the link may be wire, fiber-optics, infrared light, radio frequency signals, or other media. In addition, the primary and secondary buses may each have one or more devices, and these devices may be in one or more categories, including memory devices and input/output device. Moreover, the devices may operate at a variety of clock speeds, bandwidths and data rates. Furthermore, transactions passing through the bridge may be accumulated as posted writes or as pre-fetched data, although some embodiments will not use such techniques. Also, the bridge described herein can be part of a hierarchy using a plurality of such bridges having their primary side connected to the same bus or to buses of an equivalent or different level. Additionally, the illustrated ports 25 can be of a different number or type, or can be eliminated in some embodiments. Also, the illustrated arbiter can be eliminated for secondary buses that are not design to be occupied by a master. While a sequence of steps is described above, in other embodiments these steps may be increased or reduced in number, or performed in a different order, without departing from the scope of the present invention.

Obviously, many modifications an variations of the present invention are possible in light of the above teachings It is therefore to be understood that within the scope of the appended claims, the invention may be practiced otherwise than as specifically described.

I claim:

1. A method that provides an ability to transfer a data across a connection between two computing devices, comprising:
   receiving a data comprising an address on a first side of a bridge;
   identifying the address as a pending address when the address represents a transaction on a side of the bridge (the first side of the bridge) different from a side of the bridge where the address is identified (the second side of the bridge);
   transferring the data comprising the pending address to an encoder;
   adding bits indicative of a transaction type to the data to create a link transferable data; and
   sending the link transferable data from the first side of the bridge to the second side of the bridge.

2. The method of claim 1 wherein the first side of the bridge resides in a first application specific integrated chip (ASIC) and the second side of the bridge resides in a second ASIC.

3. The method of claim 1 further comprising the acts of:
   receiving a second data comprising a second address on the second side of the bridge;
   identifying the second address as second pending address when the second address represents a transaction destined for the first side of the bridge;

transferring the second data comprising the second pending address to a second encoder;

adding bits indicative of a transaction type to the second data to create a second link transferable data; and sending the second link transferable data from the second side of the bridge to the first side of the bridge.

4. The method of claim 3 wherein the steps of:

sending the link transferable data from the first side of the bridge to the second side of the bridge; and sending the second link transferable data from the second side of the bridge to the first side of the bridge;

occur at the same time.

5. The method of claim 4 wherein the act of sending the link transferable data occurs on a first link, and the act of sending the second link transferable data occurs on a second link.

6. The method of claim 4 wherein the steps of:

sending the link transferable data from the first side of the bridge to the second side of the bridge; and sending the second link transferable data from the second side of the bridge to the first side of the bridge;

occur in the same clock cycle.

7. The method of claim 1 further comprising the act of asserting control of a primary bus.

8. The method of claim 7 further comprising the act of sending a request signal to an internal arbiter.

9. The method of claim 7 further comprising the act of driving an address onto the primary bus.

10. The method of claim 7 further comprising the act of driving a control signal onto the primary bus.

11. The method of claim 1 further comprising the act of loading a register with information indicative of a range of addresses defining a jurisdiction of an interface.

12. The method of claim 1 wherein the bits indicative of a transaction type are tag bits.

13. The method of claim 1 wherein the transaction type is an addressing cycle.

14. The method of claim 13 further comprising the act of proceeding to a data cycle without waiting on the addressing cycle to complete.

15. The method of claim 13 further comprising the act of tagging the transmitted information to identify it as part of a burst.

16. The method of claim 13 further comprising the act of tagging the transmitted information to identify it as a single transaction.

17. The method of claim 1 further comprising the act of breaking the data into frames.

18. The method of claim 17 wherein the frames carry flow control information.

19. The method of claim 17 further comprising the act of transmitting the frames serially over the connection.

20. The method of claim 19 wherein the connection is a serial link.

21. A system that enables data transfers across a connection between two computing devices, comprising:

a first application specific integrated circuit (ASIC) configured to enable information transfer to a second ASIC, the first ASIC having a first register and a second register therein;

the second ASIC configured to enable information transfer to the first ASIC, the second ASIC having a third register and a fourth register therein;

a first serial link that couples the first register and the third register; and a second serial link that couples the second register and the fourth register.

22. The system of claim 21 wherein the first ASIC and the second ASIC are configured to enable an expanded computer system.

23. The system of claim 21 wherein the first serial link is a twisted pair wire.

24. The system of claim 21 wherein the second serial link is a twisted pair wire.

25. The system of claim 21 wherein the first serial link is a coaxial cable.

26. The system of claim 21 wherein the first serial link is a fiber-optic cable.

* * * * *